T. CARR.
Machines for the Manufacture of Flour.

No. 145,830. Patented Nov. 25, 1873.

Witnesses. Inventor.

UNITED STATES PATENT OFFICE.

THOMAS CARR, OF BRISTOL, GREAT BRITAIN.

IMPROVEMENT IN MACHINES FOR THE MANUFACTURE OF FLOUR.

Specification forming part of Letters Patent No. 144,830, dated November 25, 1873; application filed April 28, 1871.

*To all whom it may concern:*

Be it known that I, THOMAS CARR, of the city and county of Bristol, in the Kingdom of Great Britain and Ireland, have invented Improvements in Reducing Wheat and other Seeds to Flour, of which the following is a specification:

My invention relates to certain improvements in the "disintegrator" patented by me August 10, 1869, and in England, October 22, 1868, so as to make it applicable to the manufacture of an improved flour from wheat and other seeds, the flour and process of making the same being subjects of a patent issued to me on the 15th of August, 1871.

Up to the time of my present invention the said disintegrator was not designed for, or supposed to be capable of, reducing material of light specific gravity, such as wheat or seeds, and none of the machines as hitherto constructed or worked which have not been made with more than four cages could operate upon seeds so as to reduce them to flour; but I found that, by considerably increasing the number of cages and greatly increasing their speeds of rotation, I could not only reduce wheat and other seeds to flour, but that this mode of reduction produced, at little cost, a flour of very superior quality.

The improvements in the machine are as follows: First, the two, three, or more sets of bars or cages nearest the center all rotate in the same direction and serve to scale off the bran without reducing it to powder, and also to give increased strength to carry and drive the annular disk, which carries from four to eight more cages than have been hitherto used in disintegrators for other purposes, the large disk also carrying a corresponding number of cages; second, the application within the innermost cage of two cylinders having a series of openings or slits all around, or an equivalent arrangement to cause the wheat or seed to be more equally distributed all around in every part of the cages; third, the use of an exhaust-draft in combination with the machine, sufficiently strong to extract the light cerealine from the flour while it is dispersed in the casing, as it is when thrown from the cages of the machine.

Figure 1:
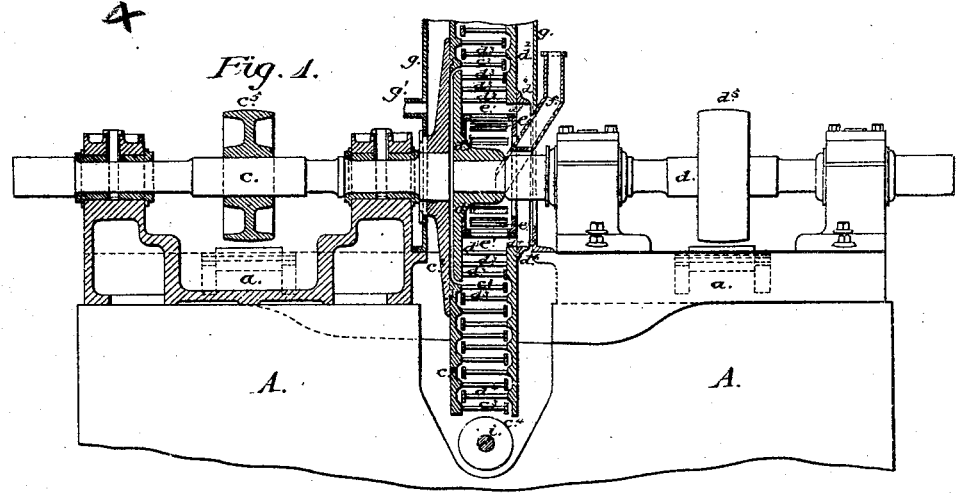
Figure 3:
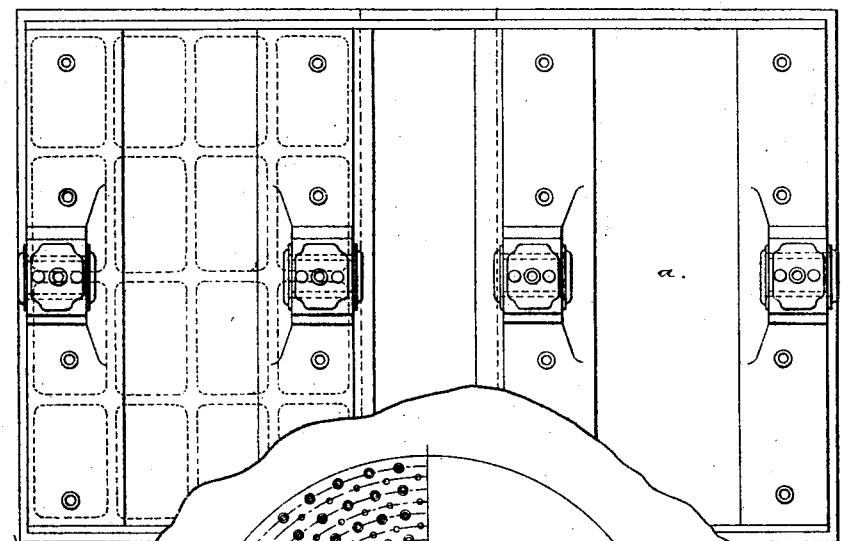
Figure 2:
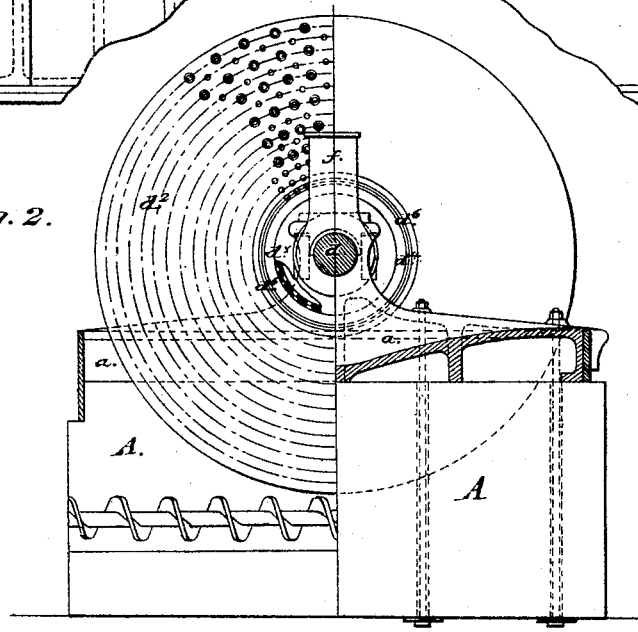

Figure 1 on the accompanying drawing is a longitudinal side elevation, partly in section, of the machine for reducing wheat and seeds to fine or coarse flour. Fig. 2 is an end or front section of the same machine, each half of the section being taken in a different plane; and Fig. 3 is a plan of the base-plate and pedestals for the machine.

A is the foundation. $a$ is the base-plate, formed and connected together and secured to the foundation as shown. The base-plates have pedestals cast in them for the two shafts. These shafts $c$ and $d$ are formed of steel, with the disks for the cages keyed thereon. The disks are of wrought-iron plate, and the bars, by preference, of steel. On the shaft $c$ a disk, $c^1$, is keyed, and to this disk is secured an annular disk, $c^2$, from which project all the bars $c^3$ of one set of cages, the ends of each set of bars forming a cage being connected together in a ring, $c^4$. On the shaft $d$ a disk, $d^1$, is secured, from which project the bars $d^3$, forming the first three cages, the outer ends of these bars being all secured in one annular disk, $d^2$, from which extend the bars $d^3$, that form the cages alternating with those carried by the large disk on the shaft $c$. These ends of the bars forming each of the cages carried by the annular disk $d^2$ are connected together in a ring, $d^4$. In the machine shown by the drawings there are fourteen cages, the first three cages from the center containing thirty-four, forty, and forty-six bars, respectively, and all rotate in the same direction, while the other eleven cages contain, in succession, fifty-two, fifty-eight, sixty-two, seventy, seventy-four, seventy-nine, eighty-five, ninety-one, ninety-eight, one hundred and fifty, and one hundred and fifty-eight bars, respectively, which rotate in opposite directions—that is, the first, second, third, fifth, seventh, ninth, eleventh, and thirteenth cages all rotate in one direction, and the fourth, sixth, eighth, tenth, twelfth, and fourteenth cages, all in the other direction. A cylinder with a series of slits or holes in it is secured to the annular disk $d^1$, and contains another cylinder or register, which has corresponding slits or holes, and which may be adjusted by slightly rotating it to make the slits or holes in each correspond more or less perfectly, and thus increase or decrease the width of the slits, and give more or less space for the seed to pass through, the cylinder being secured, after adjustment, by set-screws passing through short concentric slots in the flanges, or by other means. There is an annular space, $d$, left for air between the cylinder and the annular disk $d^2$. The front of the casing $g$, the sides of which are partly shown in Fig. 1, is left open to admit air, and to the casing a pipe, $f$, is fixed, having an outlet branch on each side of the shaft $d$, through which the grain is fed. The space between the front of the disk $d^2$ and the casing is closed by a projecting ring, $d^6$, secured to the disk, as shown. $c^5$ and $d^5$ are pulleys for the driving-belts, the shafts $c$ and $d$ being driven in opposite directions by means of an open and crossed strap. A wrought-iron boiler-plate casing, $g$, (partly shown,) of any convenient form, is used to close the cages, and in its upper part a pipe, $g'$, is fixed, which is connected with an exhausting device, which withdraws the cerealine and discharges it into a suitable chamber, the draft being moderated to withdraw only the light cerealine, and not the flour.

The grain to be operated upon is introduced into the inner chamber formed by the two cylinders, (by the pipe and hopper $f$,) and its escape therefrom is retarded by the narrowness of the exit-slits formed between the two cylinders, to such an extent that it takes an entire revolution, or thereabout, before the grain received, when passing the feeding-spout, is fully discharged from the rotating chamber; thus every part of the cages receives a due proportion, and comes into simultaneous operation throughout their entire circumference.

To increase the draft through the machine, a few narrow fan-blades may be applied to the outer periphery of the cages.

The mixed flour and bran will fall to the lower part of the recess below the cages, and may be removed by a screw, $i$, as shown.

The shafts, disks, rings, and pulleys are turned as true, and are balanced as accurately, as possible, and the shafts $c$ and $d$ are each driven, in opposite directions, at about six hundred revolutions per minute.

I claim—

1. A flour-mill consisting of parallel disks, carrying five or more annular rows of bars or cages, arranged alternately, and devices, substantially as described, for rotating the disks and cages rapidly in opposite directions.

2. The disk $d^1$, carrying two or more concentric series of bars, in combination with the parallel disks and cages, rotating in opposite directions, as set forth.

3. The combination of the disks, rotating in opposite directions, their cages, and the inner chamber, provided with openings or slots adjustable in size, substantially as specified.

4. The combination, with the disks and cages, of an outer casing having an outlet, $g'$, as and for the purpose specified.

In testimony whereof I have signed my name to this specification in the presence of two subscribing witnesses.

THOMAS CARR.

Witnesses:
GEORGE HENRY WOOKEY,
EDMUND HAYNES BELL.